(12) United States Patent
Gamble

(10) Patent No.: US 12,656,226 B1
(45) Date of Patent: Jun. 16, 2026

(54) GRAIN SAMPLE APPARATUS

(71) Applicant: Jeffrey D. Gamble, Van Wert, OH (US)

(72) Inventor: Jeffrey D. Gamble, Van Wert, OH (US)

( * ) Notice: Subject to any disclaimer, the term of this patent is extended or adjusted under 35 U.S.C. 154(b) by 345 days.

(21) Appl. No.: 18/372,655

(22) Filed: Sep. 25, 2023

Related U.S. Application Data

(60) Provisional application No. 63/409,737, filed on Sep. 24, 2022.

(51) Int. Cl.
| | |
|---|---|
| *G01N 1/20* | (2006.01) |
| *B65G 69/00* | (2006.01) |
| *B65G 69/10* | (2006.01) |
| *F26B 9/06* | (2006.01) |
| *F26B 25/00* | (2006.01) |

(52) U.S. Cl.
CPC .............. *G01N 1/20* (2013.01); *B65G 69/00* (2013.01); *B65G 69/10* (2013.01); *F26B 9/063* (2013.01); *F26B 25/002* (2013.01); *B65G 2201/042* (2013.01); *B65G 2814/027* (2013.01); *F26B 2200/06* (2013.01); *G01N 2001/2021* (2013.01)

(58) Field of Classification Search
CPC .................. G01N 1/20; G01N 1/2035; G01N 2001/2021; F26B 9/063; F26B 25/002; F26B 25/22; F26B 2200/06; B65G 69/00; B65G 69/10; B65G 2201/042; B65G 2814/027
See application file for complete search history.

(56) References Cited

U.S. PATENT DOCUMENTS

| | | | | | |
|---|---|---|---|---|---|
| 3,457,789 | A | * | 7/1969 | Martini ..................... | G01N 1/20 73/863.44 |
| 3,585,864 | A | * | 6/1971 | Dellyes .................... | G01N 1/20 73/863.56 |
| 3,751,991 | A | * | 8/1973 | Fisher ...................... | G01N 1/20 73/863.44 |
| 4,055,088 | A | * | 10/1977 | Diss ......................... | G01N 1/20 73/863.56 |
| 4,293,854 | A | | 10/1981 | Gookins et al. | |
| 4,574,645 | A | | 3/1986 | Allen et al. | |
| 4,599,809 | A | | 7/1986 | Parkes | |
| 4,625,570 | A | | 12/1986 | Witherspoon et al. | |
| 4,663,978 | A | | 5/1987 | Lenski et al. | |
| 4,750,273 | A | | 6/1988 | Parkes et al. | |
| 4,838,094 | A | * | 6/1989 | Baldock ................... | G01N 1/20 73/863.81 |
| 4,918,999 | A | | 4/1990 | Wenshau et al. | |
| 5,020,246 | A | | 6/1991 | Rust et al. | |
| 5,604,996 | A | * | 2/1997 | Bestwick ................ | F26B 9/063 73/863.52 |

(Continued)

*Primary Examiner* — Gene O Crawford
*Assistant Examiner* — Keith R Campbell
(74) *Attorney, Agent, or Firm* — MIP Legal, Ltd.; Bryce D. Miracle

(57) ABSTRACT

A grain sampling apparatus is integrated and mounted to a grain storage bin that has a device for drying the grain from the top. The grain sampling apparatus is configured for integration and mounting with a grain storage bin having a base, an upright cylindrical wall, and a plurality of dump chutes. Primarily, the grain sampling apparatus is configured to selectively sample and convey grain from the top of the bin to an exterior dispensing point. Thereafter, the sample of grain can be tested for water content.

8 Claims, 18 Drawing Sheets

(56)          References Cited

U.S. PATENT DOCUMENTS

| | | |
|---|---|---|
| 6,035,727 A | 3/2000 | Preston |
| 6,119,531 A | 9/2000 | Wendte et al. |
| 6,520,035 B2 | 2/2003 | Long et al. |
| 6,532,836 B1 | 3/2003 | Payne |
| 8,820,181 B2 | 9/2014 | Bowsher |
| 2006/0053906 A1 | 3/2006 | Krywko |
| 2010/0212408 A1* | 8/2010 | Greten et al. |
| 2025/0354754 A1* | 11/2025 | McKay .................. F26B 9/063 |

* cited by examiner

FIG. 13

GRAIN SAMPLE APPARATUS

CROSS-REFERENCE TO RELATED APPLICATION

This application claims the benefit of a U.S. provisional patent application entitled "GRAIN SAMPLE APPARA-TUS" filed Sep. 24, 2022, having App. No. 63/409,737, the entire disclosure of which is hereby incorporated herein by reference.

FIELD OF THE INVENTION

The present invention relates to the field of grain sampling and grain inspection devices.

BACKGROUND

Previously, sampling of grain from storage bins often involved the farmer having to climb to an unsafe height to obtain a grain sample from the upper level of grain in a storage bin. The sampler often consisted of a portable probe of some length. The probe can be awkward and dangerous to operate on the top of high storage bins.

Prior samplers mounted inside storage bins, in many cases, could not withstand the great pressure exerted on them by the rapid removal of grain from the storage bin. Samplers were subject to dirt and small granules entering between moving surfaces causing them to be difficult to operate.

SUMMARY

One general aspect of the disclosure includes a grain sampling apparatus that is integrated and mounted to a grain storage bin that has a means for drying the grain from the top. In a version, the grain sampling apparatus is configured for integration and mounting with a grain storage bin having a base, an upright cylindrical wall, and a plurality of dump chutes. Primarily, the grain sampling apparatus is configured to selectively sample and convey grain from the top of the bin to an exterior dispensing point. Thereafter, the sample of grain can be tested for water content.

In an embodiment, the grain sampling apparatus includes a sample collection assembly positioned interior of the storage bin and a sample dispensing assembly positioned exterior of the storage bin. Generally, the sample collection assembly is configured to collect samples from grain falling from one or more opened dump chutes within the bin and the sample dispensing assembly is configured for conveying samples of grain from the sample collection assembly to a dispensing nozzle at or near ground level.

In certain versions of the application, the sample collection assembly includes a junction housing extending through the upright cylindrical wall having a vertical axis; a chute junction segment rotatable about the vertical axis and extending from within the junction housing and interior of the grain storage bin; and a plurality of collection chutes radially extending between the chute junction segment and a chute termination end point. In specific versions, each collection chute is positioned at an incline for catching loose falling grain and channeling the grain to the chute junction segment.

In a version, the sample dispensing assembly for receiving grain sample from the sample collection assembly includes a dispensing nozzle that dispenses the grain sample at the ground level, a rotatable coupling positioned within the junction housing that is adapted to receive grain from the chute junction segment and rotate the sample collection assembly about the vertical axis upon user input within a predetermined range, a primary vertical tubing positioned exterior of the cylindrical upright wall for providing a continuous path from the rotatable coupling to the dispensing nozzle, and a handle for engaging and disengaging the sample collection assembly between an engaged position and a disengaged position.

In certain aspects, when the handle is in the engaged position, the rotatable coupling is rotated positioning the plurality of collection chutes and termination end points into the stream of grain within the grain bin. Oppositely, when the handle is in the disengaged position, the plurality of collection chutes and chute termination end points are positioned out of the stream of grain.

These and other features of the present invention will become clear upon further review of the following specification and drawings.

BRIEF DESCRIPTION OF THE DRAWINGS

These and other features, aspects, and advantages of the present invention will become better understood with regard to the following description and accompanying figures where:

Figure 13:
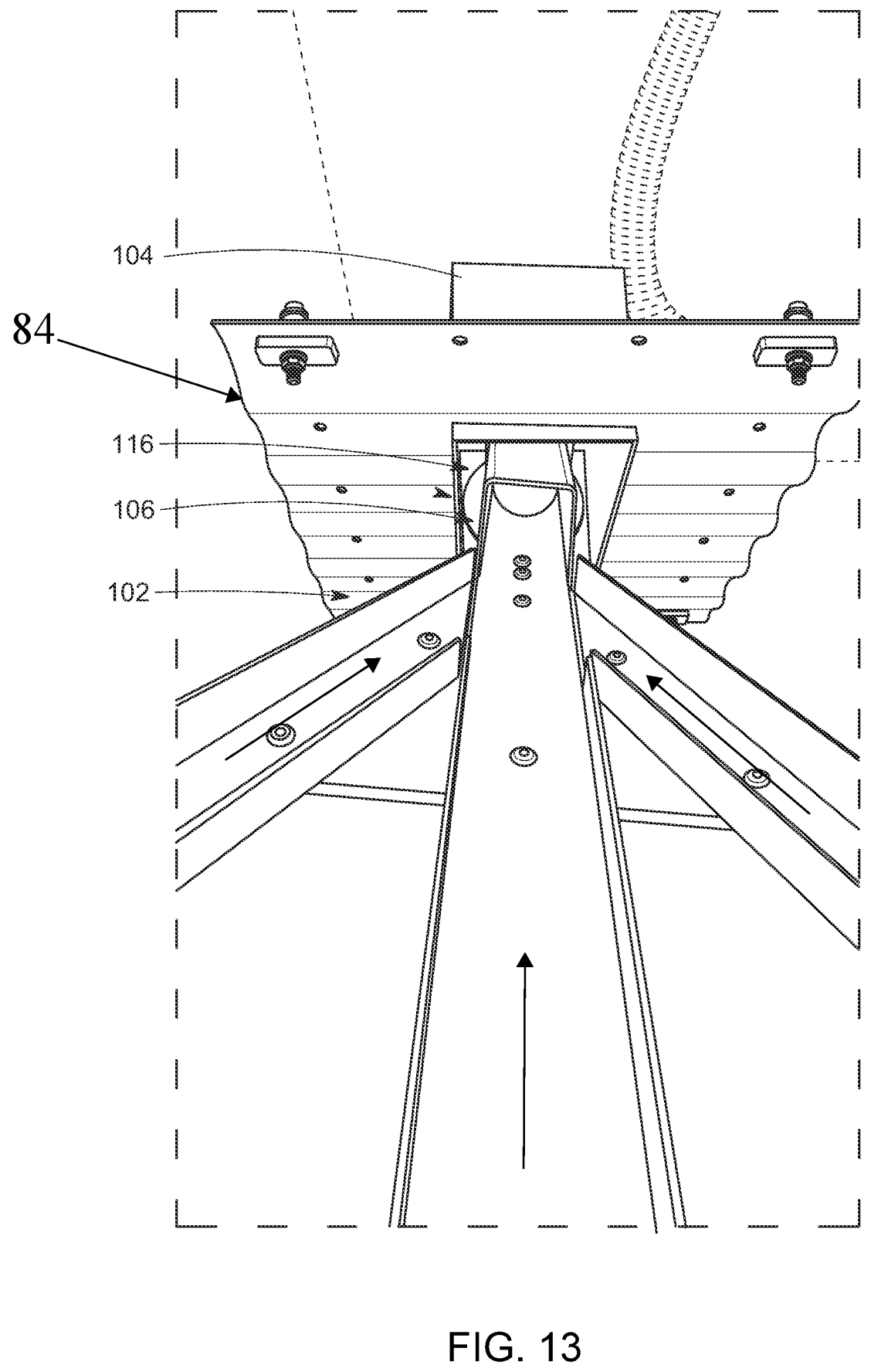

FIG. 13 is a top-down perspective view of the junction housing 104, chute junction segment 106, sample collection assembly 102, and rotatable coupling 116;

DETAILED DESCRIPTION

Figure 1:
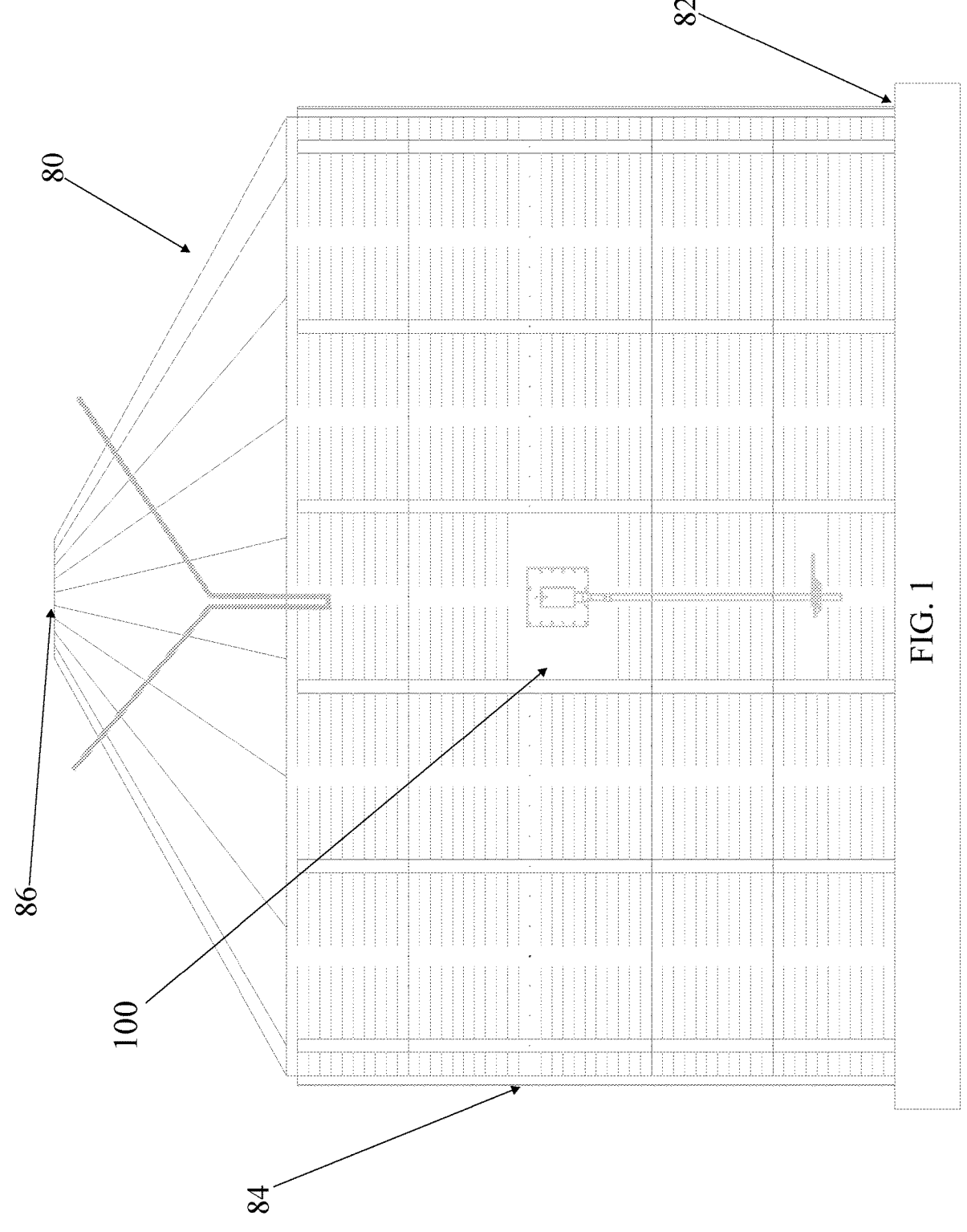
FIG. 1 is a front elevation view of the grain sampling apparatus 100 adapted to a grain storage bin 80.
Figure 2:
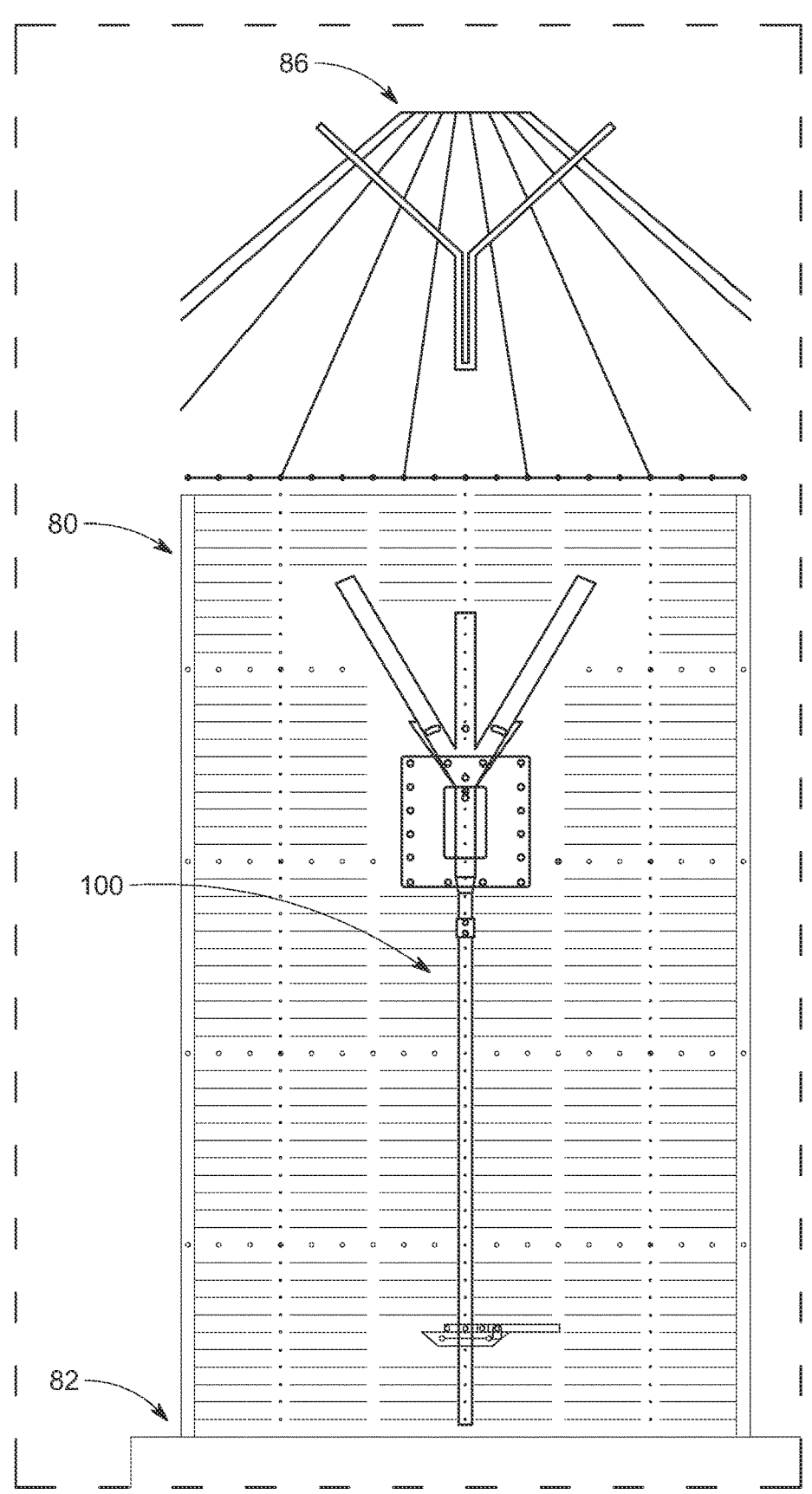
FIG. 2 is a front elevation view of the grain sampling apparatus 100 adapted to a grain storage bin 80.
Figure 3:
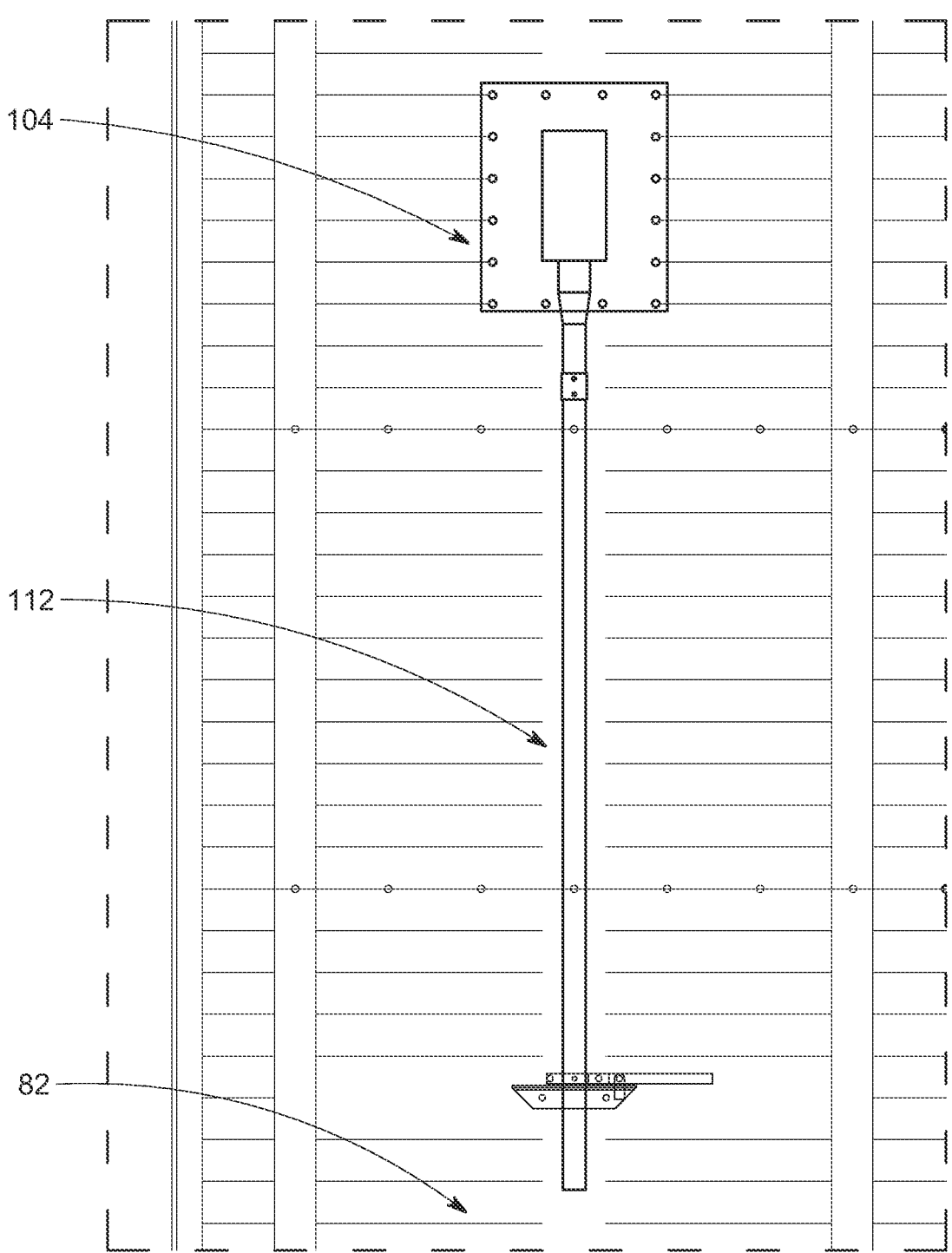
FIG. 3 is a front elevation view of the sample dispensing assembly 112 adapted to a grain storage bin 80.

In the following description, for purposes of explanation and not limitation, specific details are set forth such as particular architectures, interfaces, techniques, etc. to provide a thorough understanding of the present invention. However, it will be apparent to those skilled in the art that the present invention may be practiced in other versions that depart from these specific details. In other instances, detailed descriptions of well-known devices, circuits, and methods are omitted so as not to obscure the description of the present invention with unnecessary detail.

Moreover, the description is not to be taken in the limiting sense but is made merely for the purpose of illustrating the general principles of the invention, since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

With reference to the figures, a description of a version of the invention will be provided and is generally designated as numeral 100. Generally, the application is directed towards a grain sampling apparatus 100 for integration and mounting with a grain storage bin 80 having a means for drying the grain 98 from the top 86. Generally, the grain sampling apparatus 100 is configured to selectively sample, capture, and convey streaming or falling grain 98 from the top 86 of the grain storage bin 80 by way of one or more dump chutes 94 to an exterior dispensing point 88.

Figure 4:
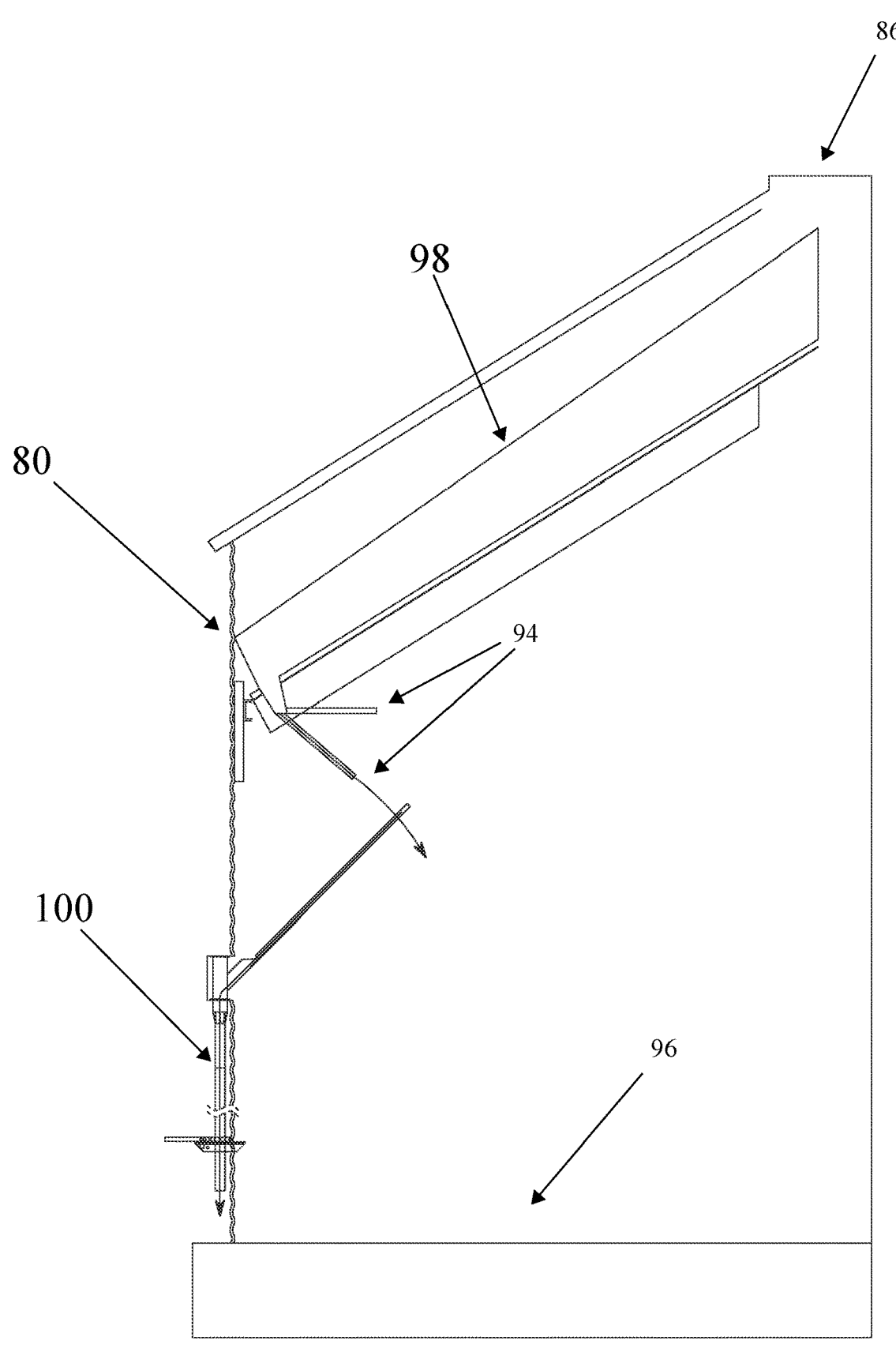
FIG. 4 is a side elevation view of the grain sampling apparatus 100 adapted to a grain storage bin 80.
Figure 6:
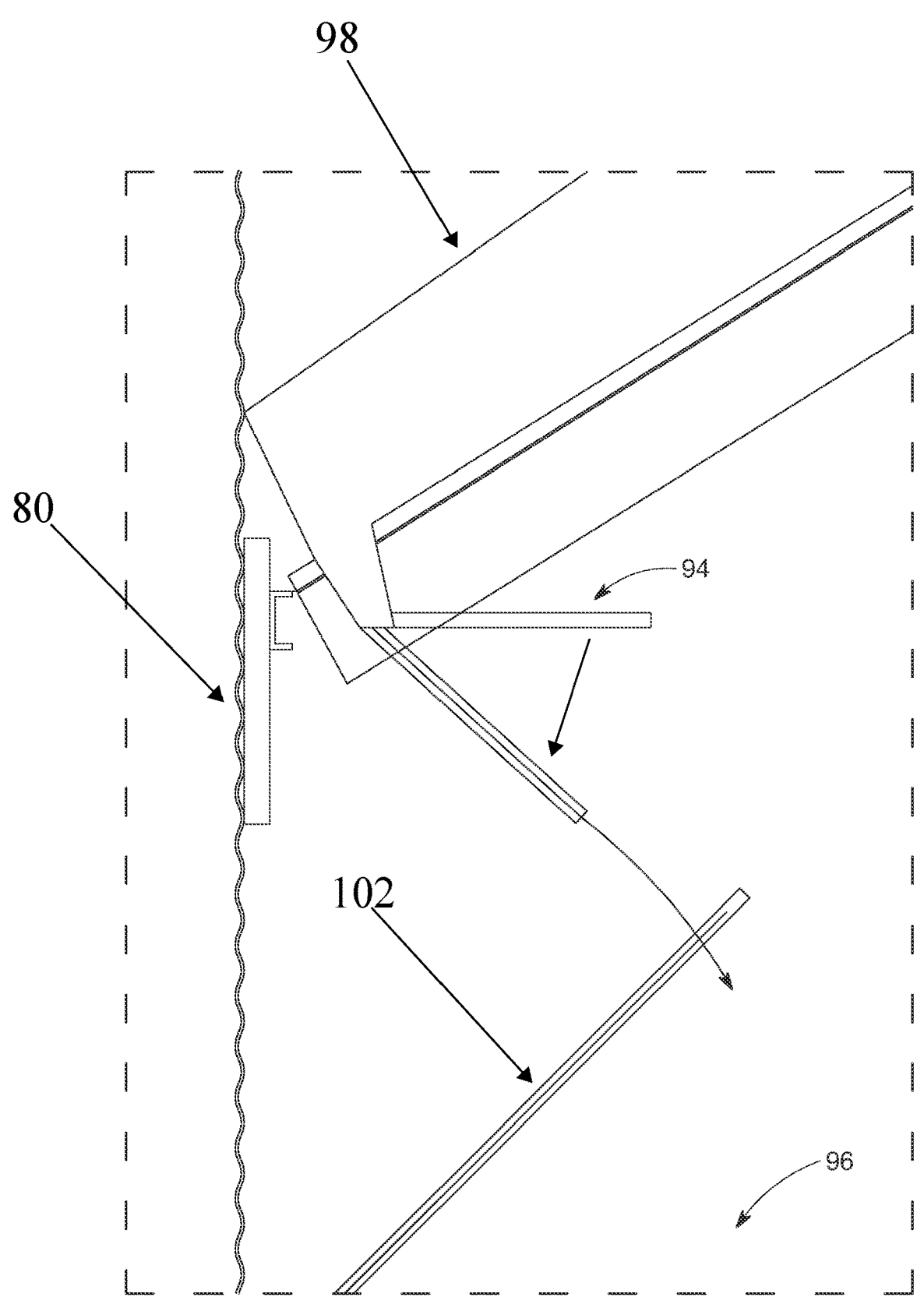
FIG. 6 is an up-close view taken from FIG. 4 showing the sample collection assembly 102 while in the engaged position catching falling grain 98 from the dump chutes 94.

By way of background and with reference to FIG. 1-FIG. 4, top dry grain storage bins 80 have a base 82, a cylindrical upright wall 84, and a top 86 for receiving grain 98 therein. The grain storage bins 80 often include a means for drying the grain 98. For example, as best shown in FIG. 4, wet grain 98 is deposited at the top 86 of grain storage bin 80 and fans are utilized to force hot air through varied depth layers of wet grain 98 in a drying chamber. When the grain 98 has dried to a predetermined temperature, the actuator opens the dump chutes 94 automatically allowing the grain 98 to fall into the cooling and storage area 96 (See FIG. 6).

Figure 5:
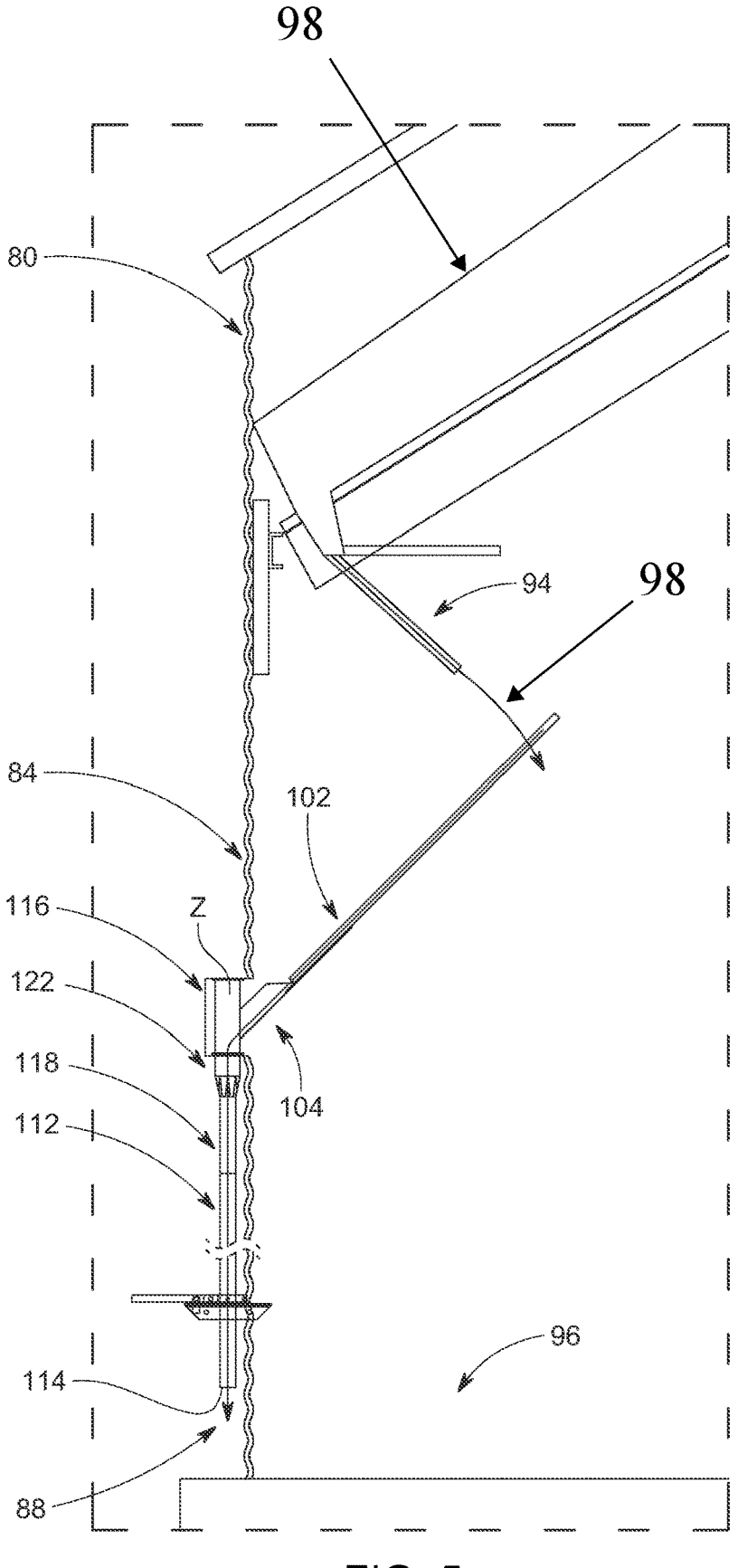
FIG. 5 is an up-close view taken from FIG. 4 showing the sample collection assembly 102 while in the engaged position catching falling grain 98 from the dump chutes 94.

Now with reference to FIG. 4-FIG. 7, in a version of the application, the grain sampling apparatus 100 is adapted to couple with a grain storage bin 80 having a means for drying the grain 98 from the top including dump chutes 94. As illustrated in FIG. 5, an example grain sampling apparatus 100 generally includes a sample collection assembly 102 for selectively capturing grain 98 streaming from the dump chutes 94 to the cooling and storage area 96. The sample collection assembly 102 conveys the captured grain 98 to a sample dispensing assembly 112 by way of a rotatable coupling 116 through a junction housing 104, allowing the grain 98 to be dispensed to an exterior dispensing point 88 at or near ground level. The junction housing 104 is a framework that allows a sealed passage between the interior of a grain storage bin 80 and the exterior.

As best illustrated by FIG. 7-FIG. 10, the sample collection assembly 102 generally comprises a chute junction segment 106 and a plurality of collection chutes 108*a-c* extending radially upward and interior of a grain storage bin 80 from and supported by the chute junction segment 106. The chute junction segment 106 and the chutes 108*a-c* are configured to be mechanically rotatable about a vertical axis Z within the junction housing 104. The plurality of collection chutes 108 extend inward and upward, terminating at chute termination end points 110. Each collection chute 108 is positioned to extend into the flow of grain 98 provided by a plurality of dump chutes 94. Each collection chute 108 is positioned at an incline for catching loose falling grain 98 and channeling the grain 98 by gravity to the chute junction segment 106.

Preferably, there are three collection chutes 108 as shown. Preferably, the outside collection chutes 108*a*, 108*c* are of equal length and the middle collection chute 108*b* length is less than the length of the outside collection chutes 108*a*, 108*c*. Preferably, the collection chutes 108 are radially positioned approximately 25-35 degrees n apart, more preferably approximately 30 degrees.

As shown in FIG. 5-FIG. 8, the sample dispensing assembly 112 is configured to receive grain 98 from the sample collection assembly 102 and dispense the sample of grain 98 exterior of the grain storage bin 80 at an exterior dispensing point 88 at or near ground level. In a version, the sample dispensing assembly 112 comprises a dispensing nozzle 114 which dispenses or deposits the sample of grain 98 at or near ground level; a primary vertical tubing 118 positioned exterior of the cylindrical upright wall 84; and a rotatable coupling 116 positioned within the junction housing 104 and connecting the primary vertical tubing 118 with the chute junction segment 106.

As shown in FIG. 8-FIG. 13, the rotatable coupling 116 is positioned within the junction housing 104 and is adapted to convey sampled grain 98 from the chute junction segment 106 to the primary vertical tubing 118, thereby providing a continuous unobstructed path to the dispensing nozzle 114. Further, the rotatable coupling 116 provides a rotational movement within a predetermined range of the chute junction segment 106 and a plurality of collection chutes 108 about the Z vertical axis housed within the junction housing 104. Preferably, the predetermined range is between 10-15 degrees t, more preferably 13 degrees.

Figure 7:
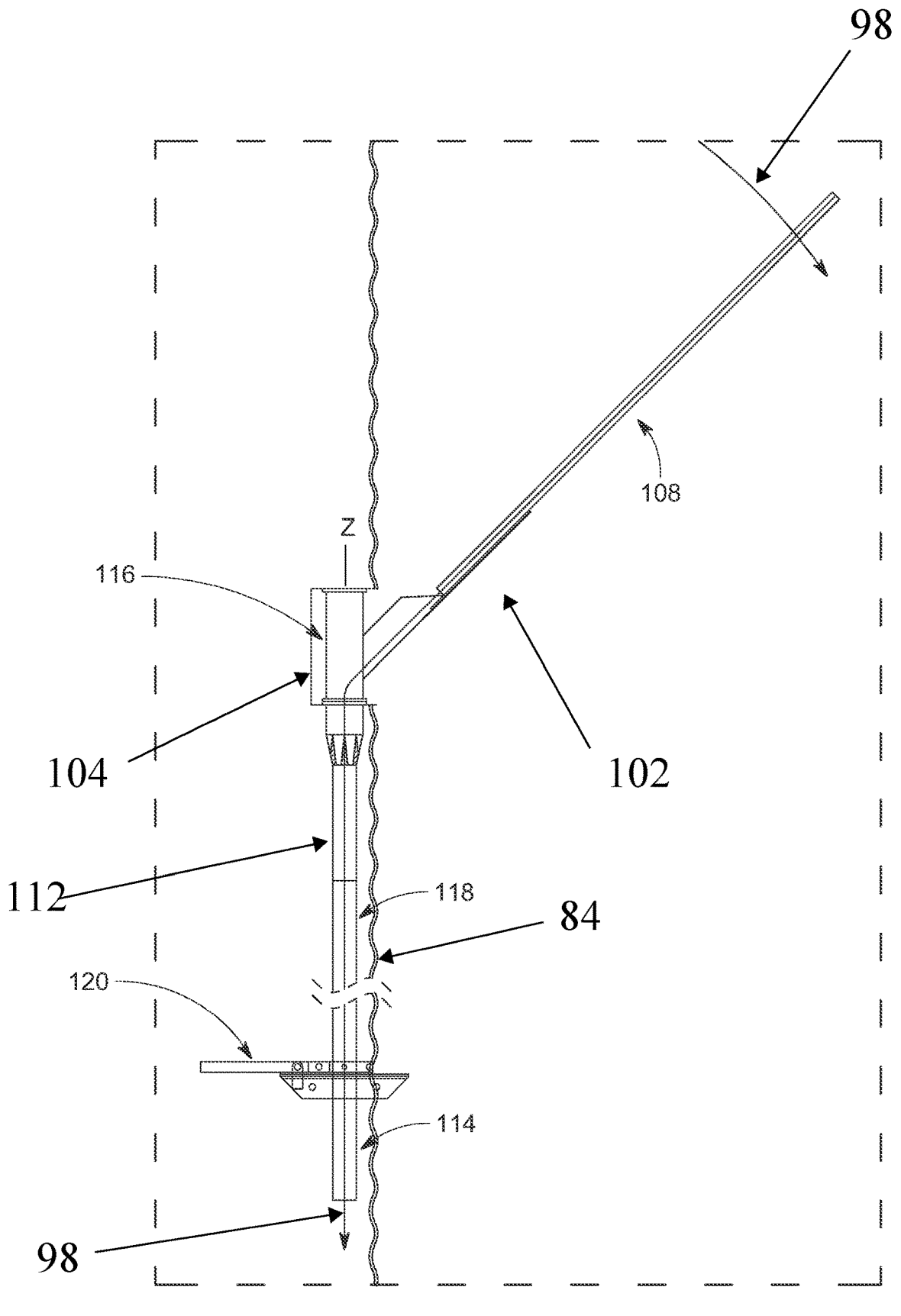
FIG. 7 is an up-close view taken from FIG. 4 showing the sample collection assembly 102 while in the engaged position catching falling grain 98.
Figure 8:
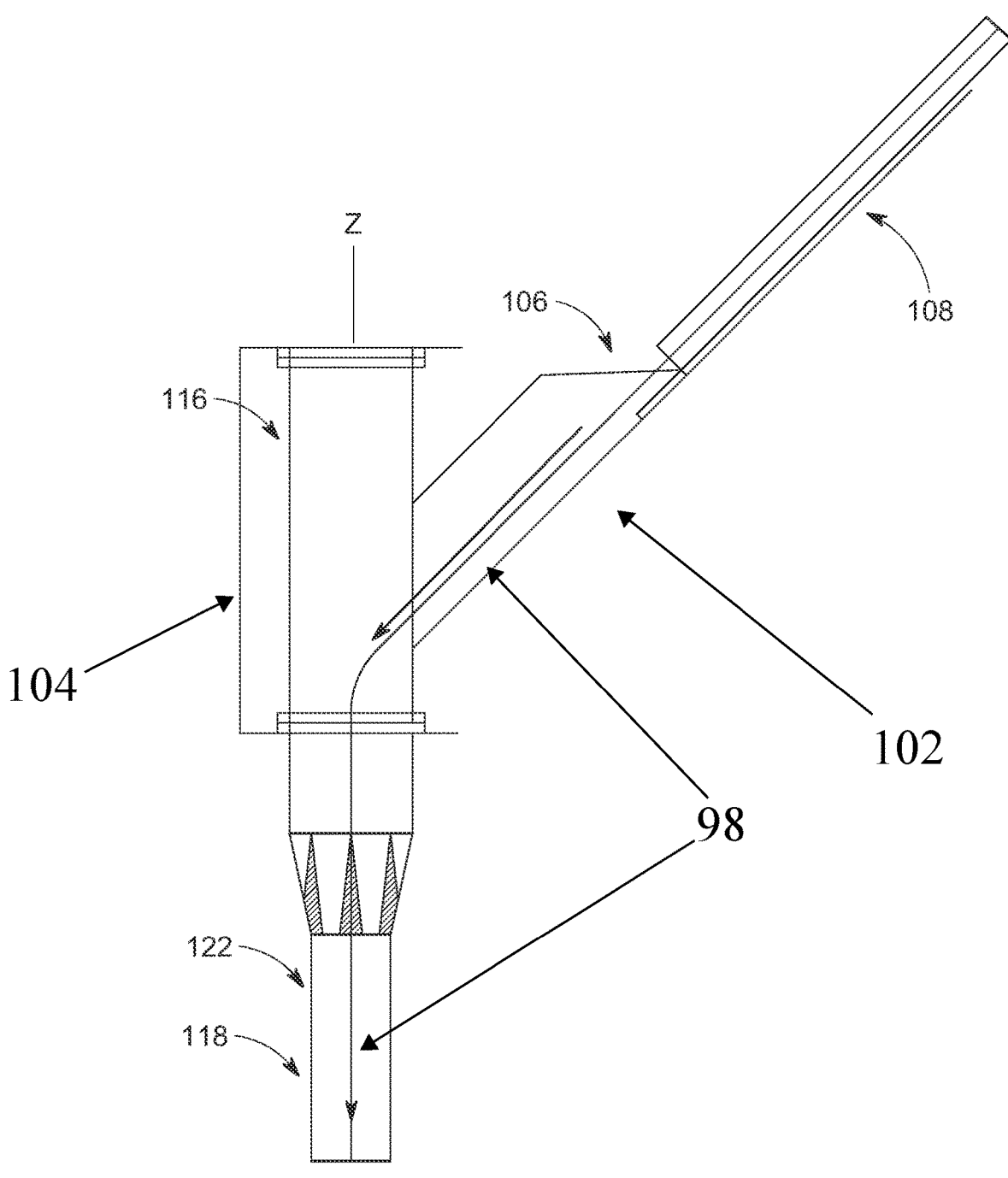
FIG. 8 is an up-close view of the rotatable coupling 116, the chute junction segment 106, and the primary vertical tubing 118.
Figure 9:
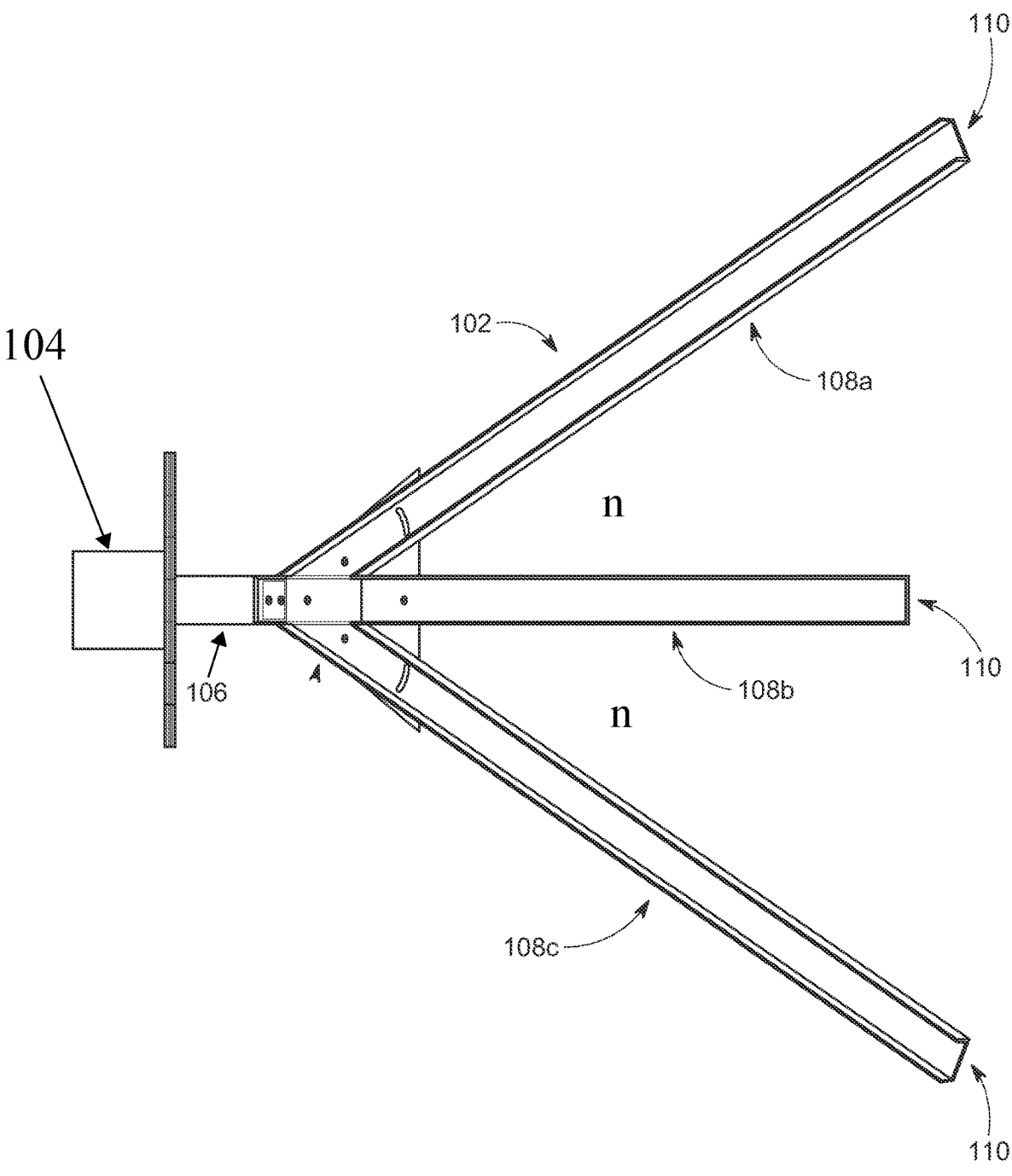
FIG. 9 is a top perspective view of the sample collection assembly 102.
Figure 10:
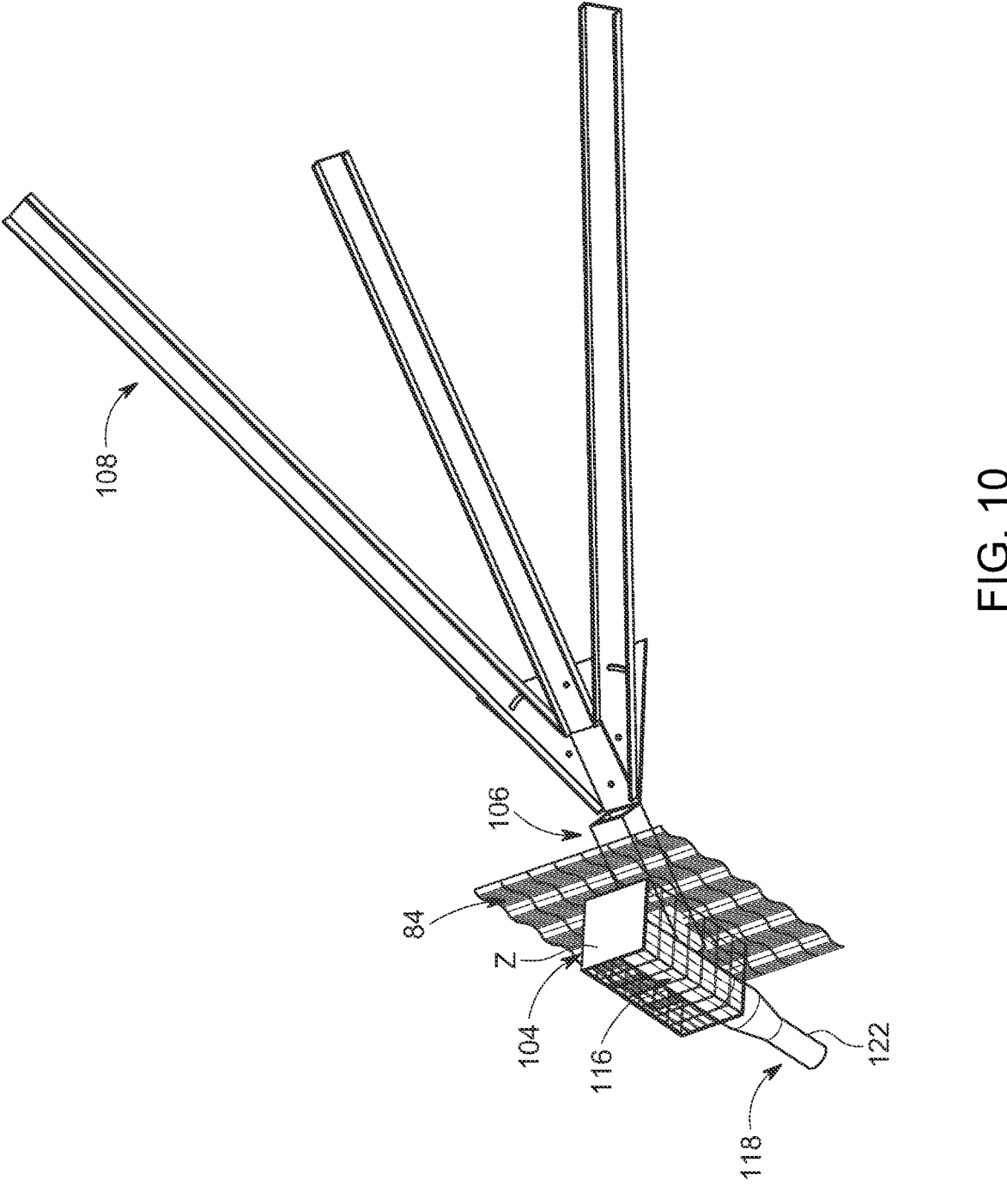
FIG. 10 is a top-side perspective view of the sample collection assembly 102, the junction housing 104, the rotatable coupling 116, and the top 122 of the primary vertical tubing 118.
Figure 11:
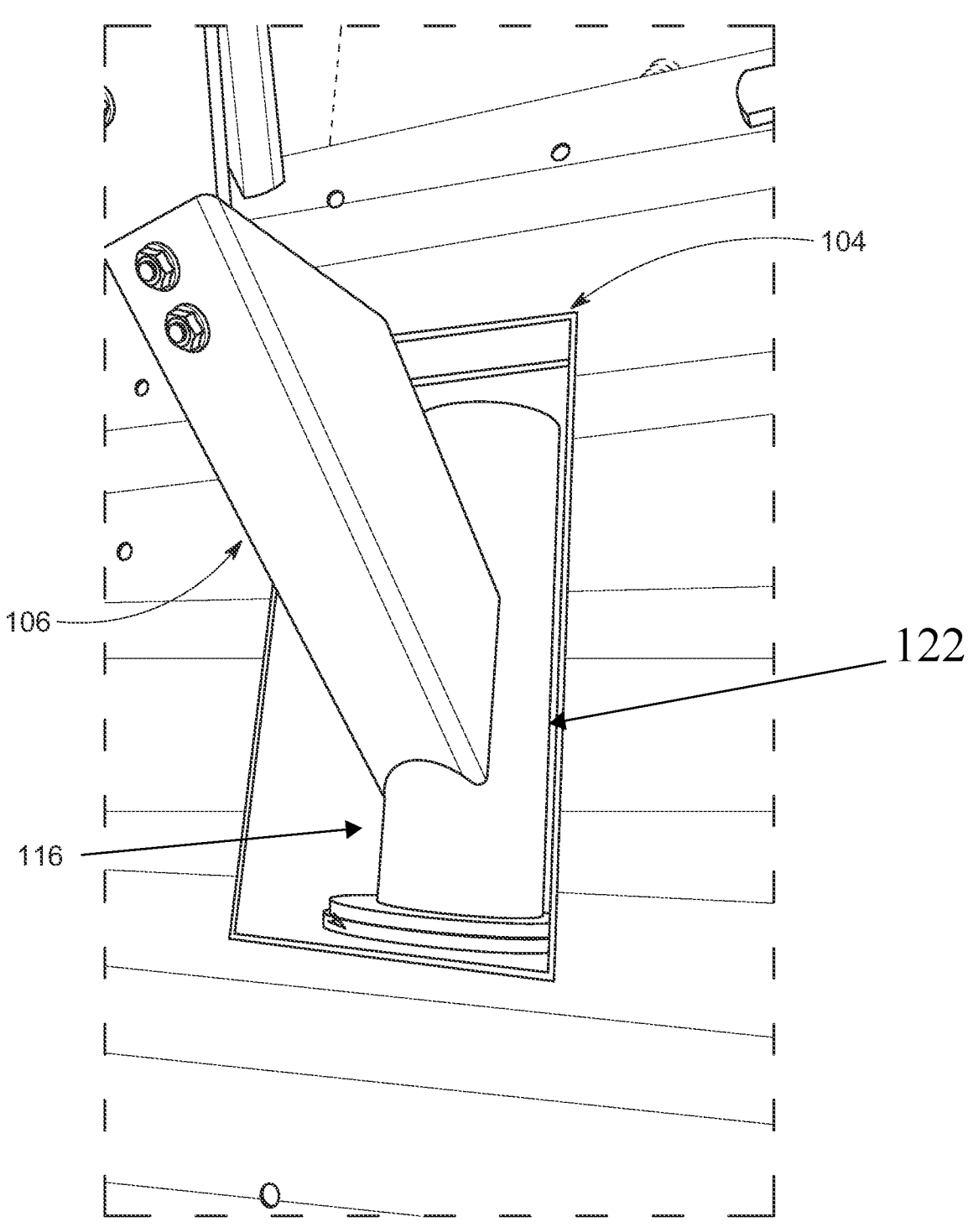
FIG. 11 is a bottom front side perspective view of the junction housing 104, chute junction segment 106, and rotatable coupling 116.
Figure 12:
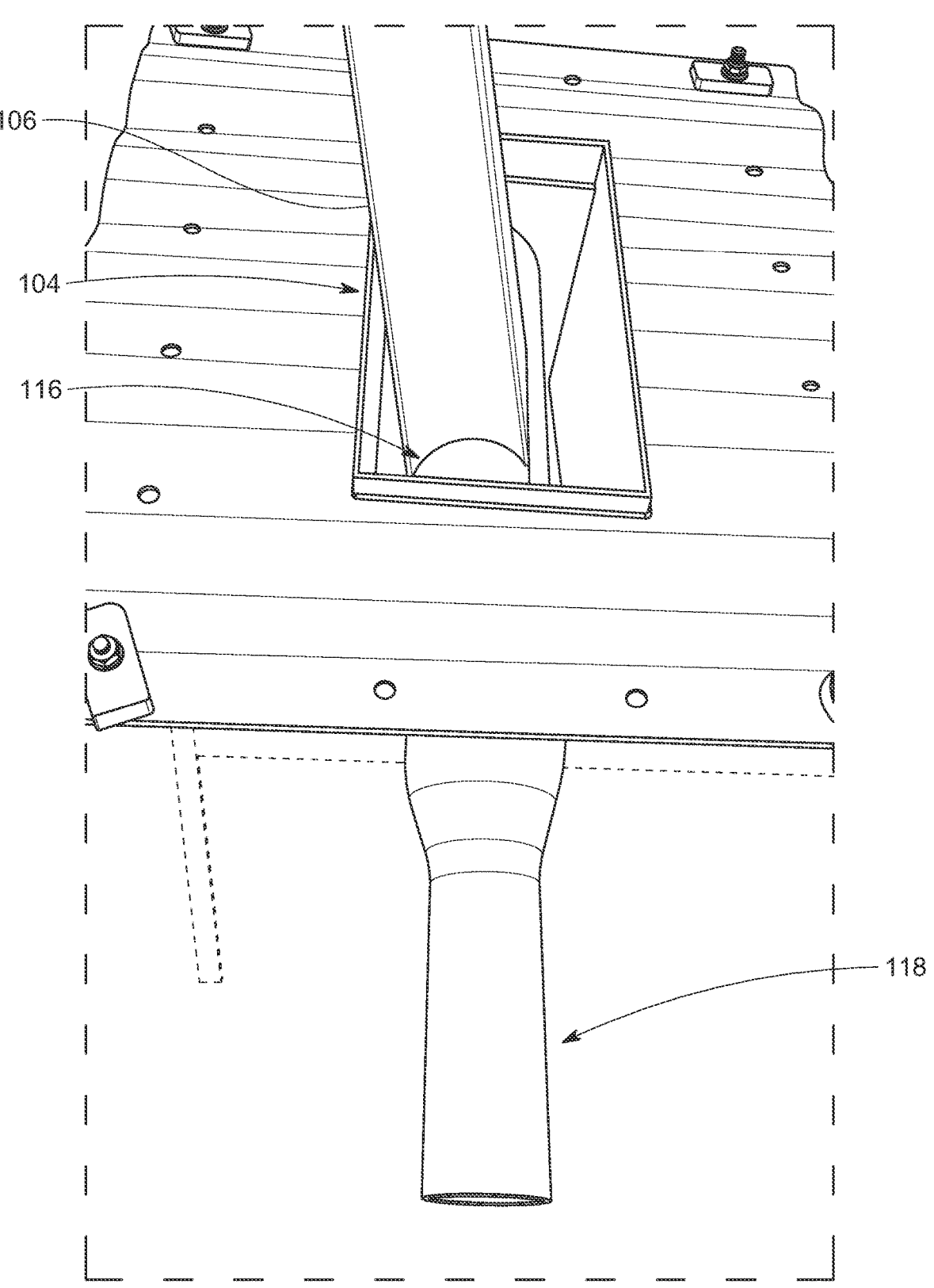
FIG. 12 is a front-side perspective view of the junction housing 104, chute junction segment 106, primary vertical tubing 118, and rotatable coupling 116.
Figure 14:
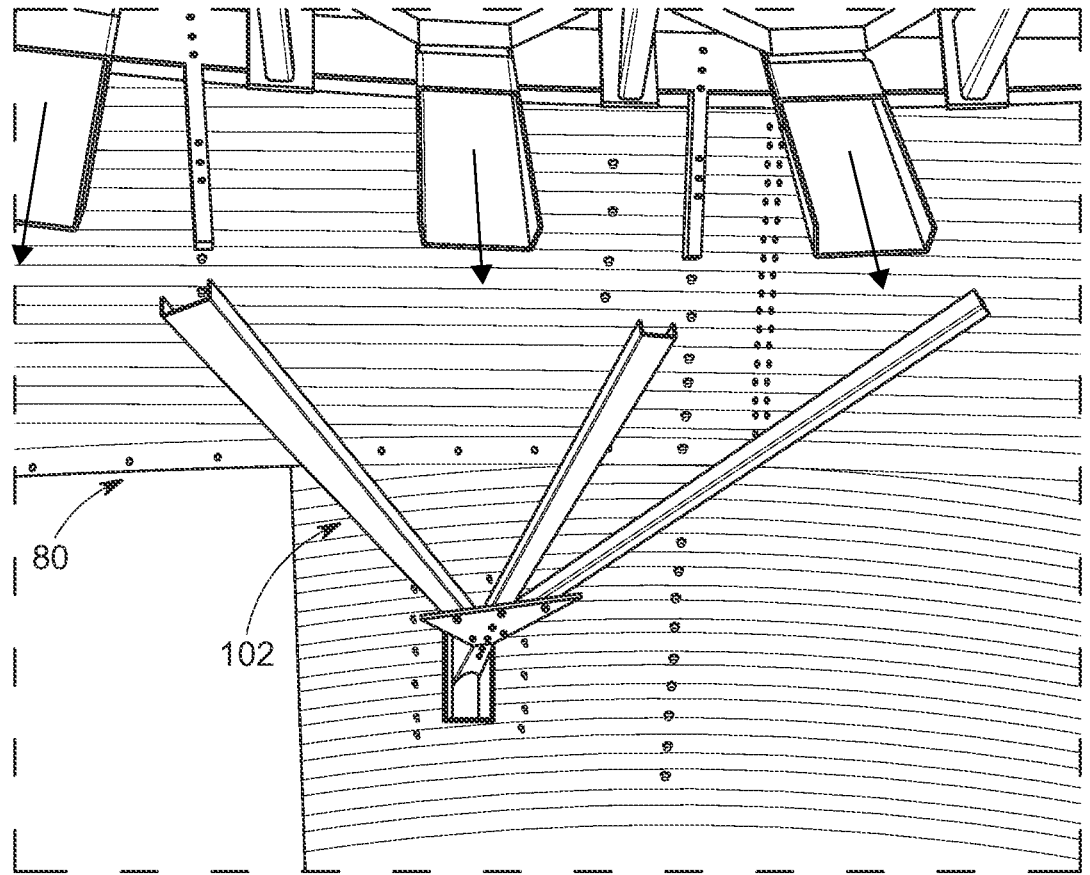
FIG. 14 is an interior view of the sample collection assembly 102 while in a disengaged position within the grain storage bin 80.

As shown in FIG. 5 and FIG. 7, the primary vertical tubing 118 is positioned exterior of the cylindrical upright wall 84 providing a continuous path from the rotatable coupling 116 to the dispensing nozzle 114, wherein the top 122 of the primary vertical tubing 118 extends through the junction housing 104 and connects with the rotatable coupling 116.

As illustrated in FIG. 7, a handle 120 is attached at or near the dispensing nozzle 114 which provides the user the authority to selectively engage or disengage the sample collection assembly 102 into and out of a stream of grain 98 flowing from one or more dump chutes 94. In the version, the handle 120 is affixed to the bottom of the vertical tubing 118, extending outward allowing the user to impart rotation to the vertical tubing 118 which in turn rotates the rotatable coupling 116 about the vertical axis Z which in turn rotates the sample collection assembly 102 in order to engage and collect a portion of the stream of grain 98 falling from the plurality of dump chutes 94.

Figure 15:
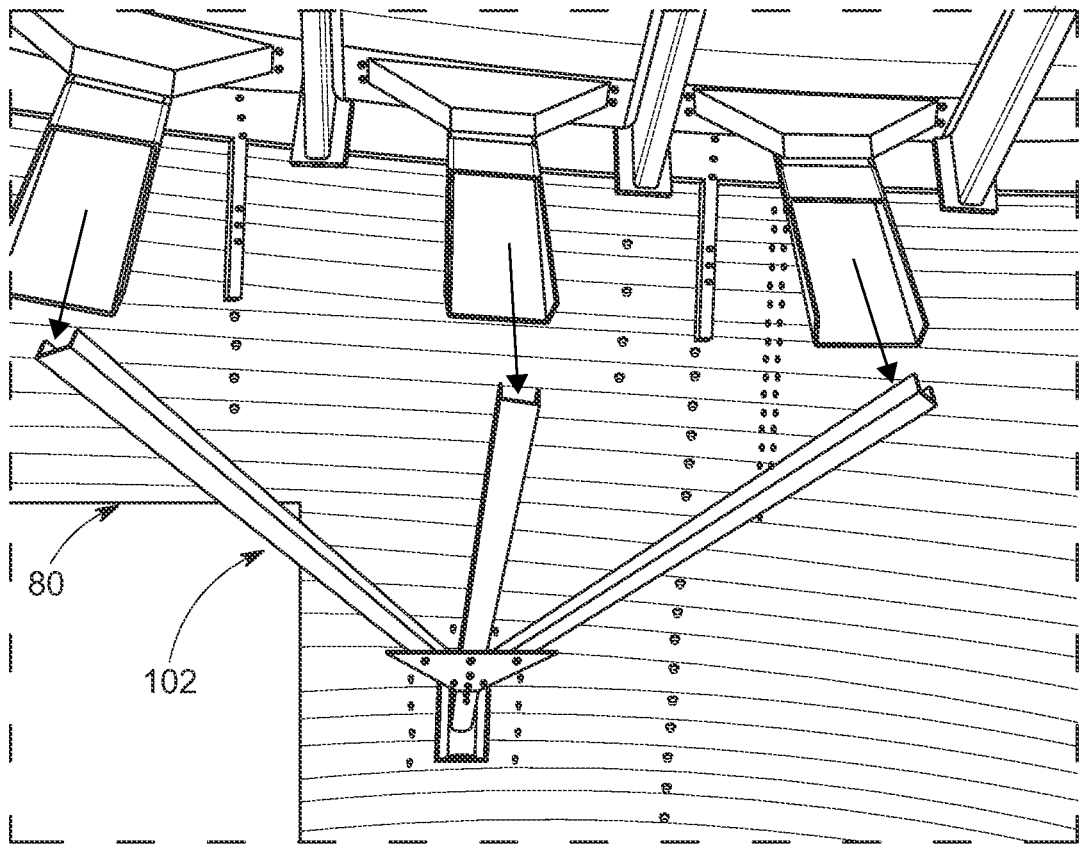
FIG. 15 is an interior view of the sample collection assembly 102 while in an engaged position within the grain storage bin 80.
Figure 16:
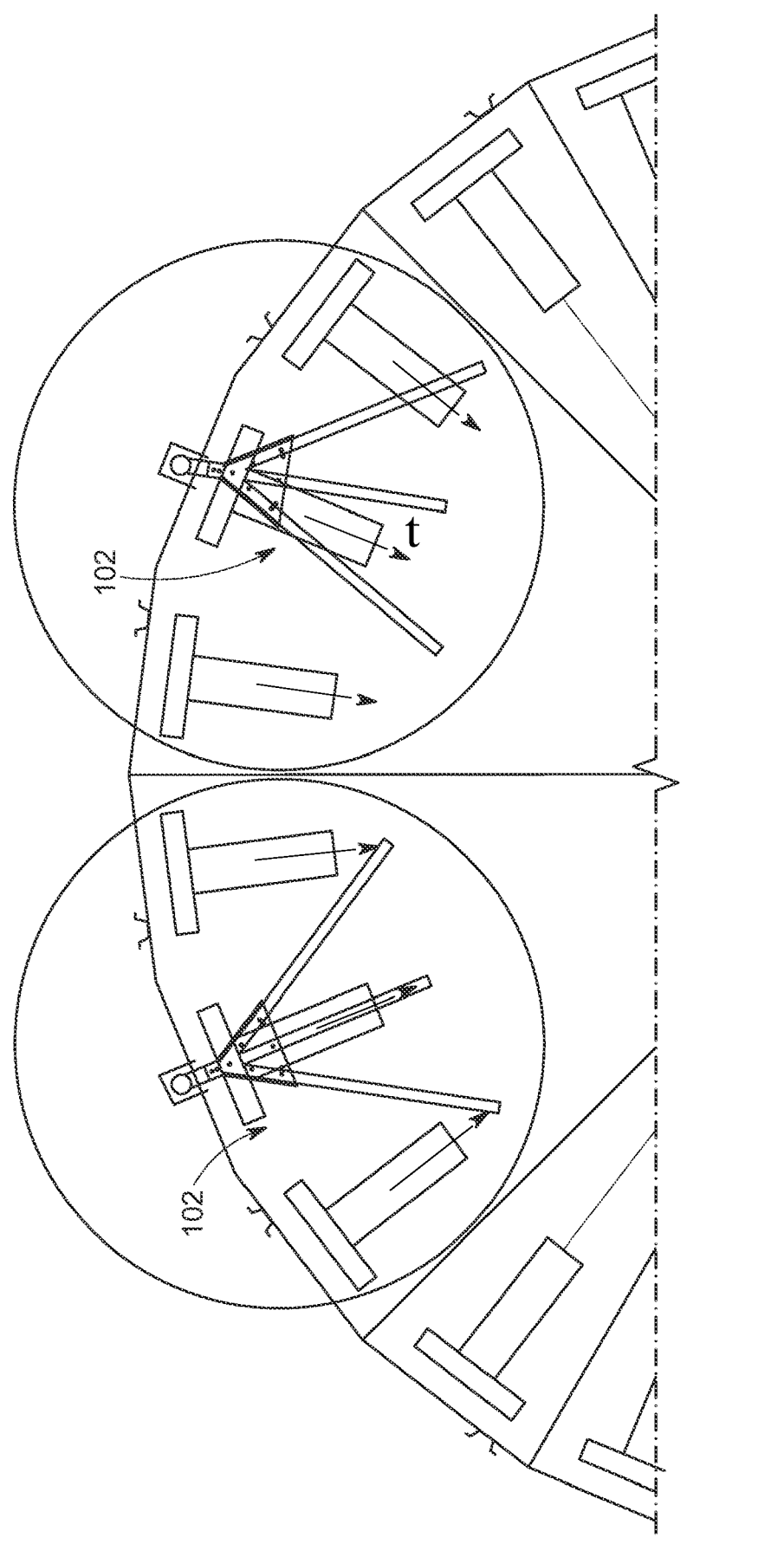
FIG. 16 is a top plan view showing the sample collection assembly 102 while in the engaged position (left) and the disengaged position (right)
Figure 17:
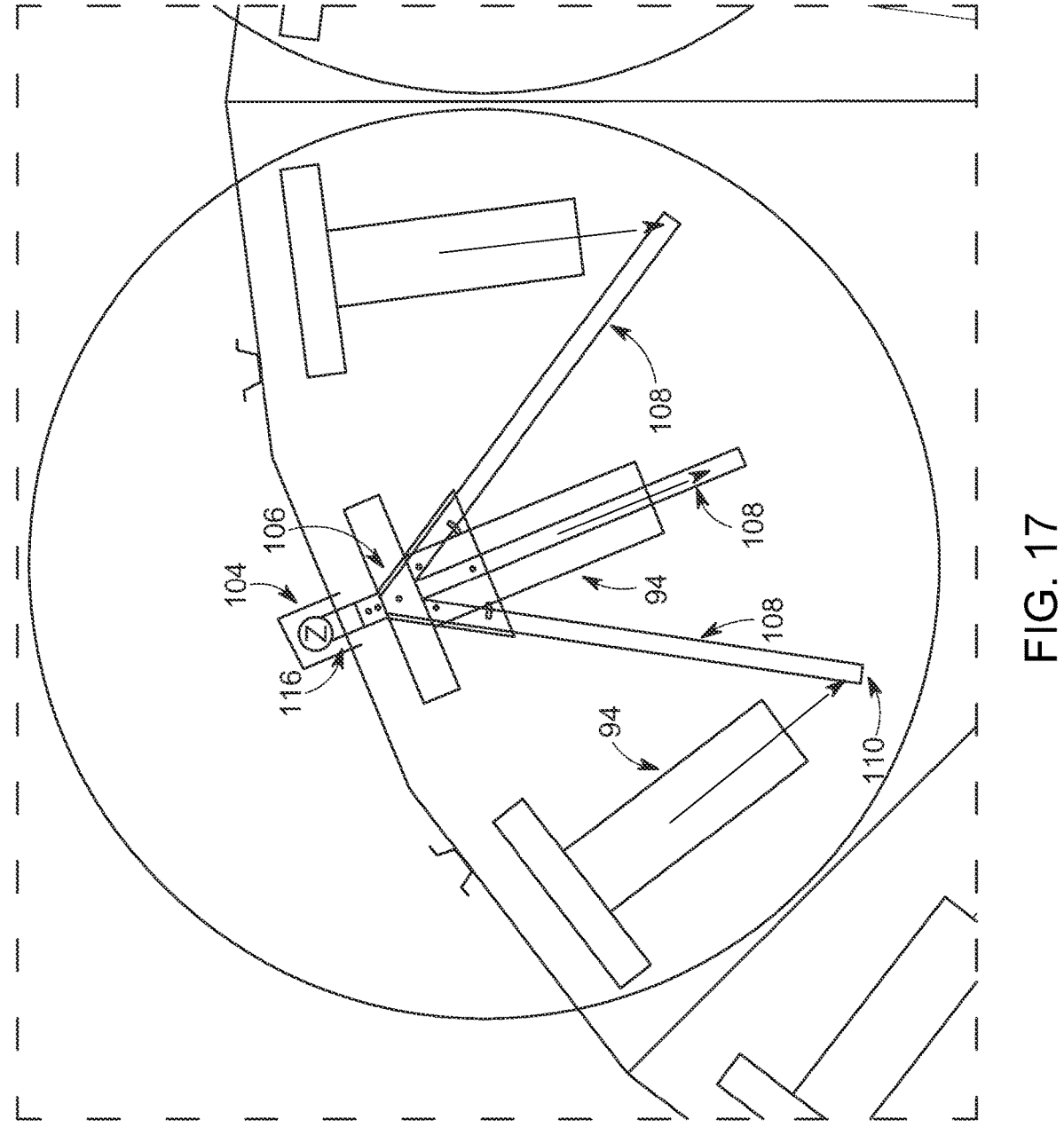
FIG. 17 is an up-close top plan view showing the sample collection assembly 102 while in the engaged position.
Figure 18:
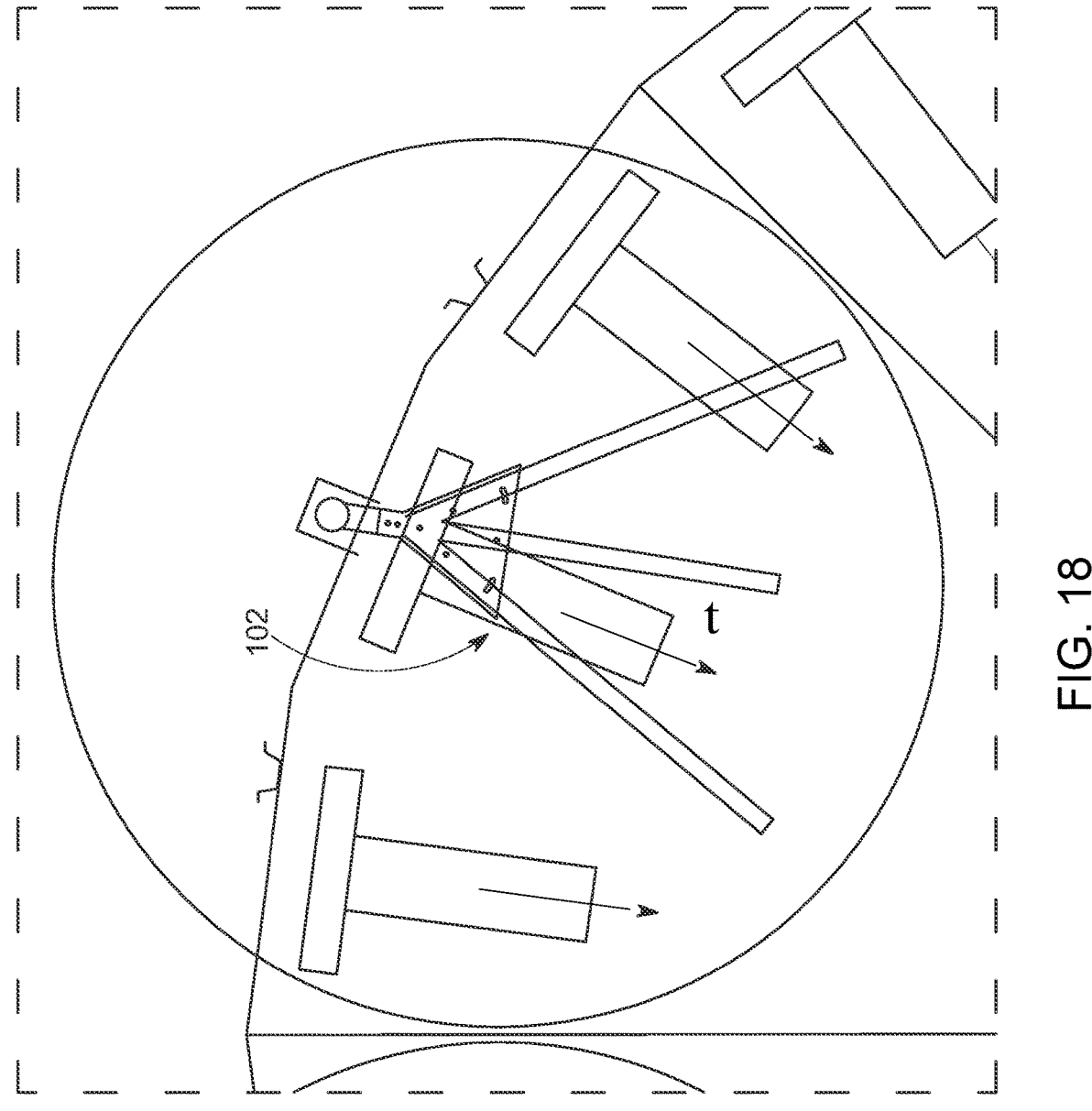
FIG. 18 is an up-close top plan view showing the sample collection assembly 102 while in the disengaged position.

In further detail of the operation of the grain sampling apparatus 100, as best shown in FIG. 14-FIG. 18, if the handle 120 is rotated and positioned in the engaged position, the vertical tubing 118 is caused to rotate the rotatable coupling 116 about axis Z and the plurality of collection chutes 108 termination end points 110 into the stream of grain 98 within the grain storage bin 80 (See specifically FIG. 15 and FIG. 17). Oppositely, if the handle 120 is rotated to the disengaged position, the collection chute 108 termination end points 110 are positioned out of the stream of grain 98 within the grain storage bin 80 (See specifically FIG. 14 and FIG. 18). Thus, when a sample of grain 98 is desired, the handle 120 is positioned in the engaged position, thereby positioning the collection chute 108 termination end points 110 into the stream of grain 98 falling from the dump chutes 94, allowing a sample to flow by way of gravity down the plurality of collection chutes 108 to the chute junction segment 106 through the junction housing 104 by way of the rotatable coupling 116, then down the primary vertical tubing 118 and finally to the dispensing nozzle 114. Thereafter, the sample can then be tested for water content.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent, or similar purpose unless expressly stated otherwise.

What is claimed:

1. A grain sampling apparatus for integration and mounting with a top dry grain storage bin having a base, an upright wall, and a plurality of dump chutes, the grain sampling apparatus is configured to selectively convey grain from the top of the bin to an exterior dispensing point, the grain sampling apparatus comprising:
   a sample collection assembly rotatable about an axis, substantially positioned interior of the grain storage bin, the sample collection assembly comprising:
   a chute junction segment; and
   a plurality of collection chutes radially extending between the chute junction segment and a chute termination endpoint, each collection chute positioned at an incline for catching loose falling grain and channeling the grain to the chute junction segment; and
   a sample dispensing assembly for receiving grain from the sample collection assembly and dispensing the grain exterior of the grain storage bin, the sample dispensing assembly comprising:
   a dispensing nozzle for dispensing the grain;
   a rotatable coupling adapted to receive grain from the chute junction segment and rotate the sample collection assembly about the axis upon user engagement within a predetermined range;
   a tubing providing a path from the rotatable coupling to the dispensing nozzle; and
   a handle for engaging and disengaging the sample collection assembly between an engaged position and a disengaged position, wherein while in the engaged position, the rotatable coupling is rotated positioning the plurality of chute termination end points into a stream of grain provided by the plurality of dump chutes within the grain storage bin, wherein while the handle is in the disengaged position, the chute termination end points are positioned out of the stream of grain.

2. The grain sampling apparatus of claim 1, wherein the sample collection assembly further comprises a junction housing extending through the upright cylindrical wall and the chute junction segment is rotatable about a vertical axis and extending from within the junction housing to the interior of the grain storage bin.

3. The grain sampling apparatus of claim 2, wherein the tubing is vertical and positioned exterior of the upright wall, wherein a top of the tubing extends through the junction housing and connects with the rotatable coupling.

4. The grain sampling apparatus of claim 1, wherein the plurality of the collection chutes are radially positioned approximately 25-35 degrees apart.

5. The grain sampling apparatus of claim 4, wherein the predetermined range of rotation of the sample collection assembly is approximately between 10-15 degrees.

6. A grain sampling apparatus for integration and mounting with a top dry grain storage bin having a base, an upright cylindrical wall, and a plurality of dump chutes, the grain sampling apparatus is configured to selectively convey grain samples from the top of the storage bin to an exterior dispensing point, the grain sampling apparatus comprising:
   a sample collection assembly positioned interior of the storage bin, the sample collection assembly comprising:
   a junction housing extending through the upright cylindrical wall and having a vertical axis;
   a chute junction segment rotatable about the vertical axis and extending from within the junction housing and interior of the grain storage bin; and
   a plurality of collection chutes radially extending between the chute junction segment and a chute termination endpoint, each collection chute positioned at an incline for catching loose falling grain and channeling the grain to the chute junction segment; and
   a sample dispensing assembly for receiving grain samples from the sample collection assembly and dispensing the sample exterior of the grain bin near ground level, the sample dispensing assembly comprising:
   a dispensing nozzle for dispensing the grain sample;
   a rotatable coupling positioned within the junction housing adapted to receive grain from the chute junction segment and rotate the sample collection assembly about the vertical axis upon user input within a predetermined range;
   a vertical tubing positioned exterior of the cylindrical upright wall providing a path from the rotatable coupling to the dispensing nozzle, wherein the top of the vertical tubing extends through the junction housing and connects with the rotatable coupling; and
   a handle for engaging and disengaging the sample collection assembly between an engaged position and a disengaged position, wherein while in the engaged position, the rotatable coupling is rotated positioning the plurality of collection chute termination end points into a stream of grain provided by the plurality of dump chutes within the grain storage bin, wherein while the handle is in the disengaged position, the chute termination end points are positioned out of the stream of grain.

7. The grain sampling apparatus of claim 6, wherein the plurality of the collection chutes are radially positioned approximately 25-35 degrees apart.

8. The grain sampling apparatus of claim 7, wherein the predetermined range of rotation of the sample collection assembly is approximately between 10-15 degrees.

\* \* \* \* \*